US011915654B1

(12) United States Patent
Zhou et al.

(10) Patent No.: US 11,915,654 B1
(45) Date of Patent: Feb. 27, 2024

(54) POWER-SUPPLY VOLTAGE GENERATOR FOR OUTPUTTING VARIED VOLTAGES TO DISPLAY PANEL

(71) Applicant: HKC CORPORATION LIMITED, Shenzhen (CN)

(72) Inventors: Renjie Zhou, Guangdong (CN); Rongrong Li, Guangdong (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/090,595

(22) Filed: Dec. 29, 2022

(30) Foreign Application Priority Data

Aug. 26, 2022 (CN) ......................... 202211030027.6

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2320/0247* (2013.01)

(58) Field of Classification Search
CPC .................................................... G09G 3/3258
USPC ........................................................... 345/204
See application file for complete search history.

(56) References Cited

U.S. PATENT DOCUMENTS

2012/0176361 A1* 7/2012 Lee ......................... H02M 3/00 345/212
2018/0144680 A1 5/2018 Yi et al.
2021/0281174 A1* 9/2021 Kang ...................... H02M 1/32

FOREIGN PATENT DOCUMENTS

CN 101996549 A 3/2011
CN 202332227 U 7/2012
CN 204558001 U 8/2015
CN 105118472 A 12/2015
CN 105353816 A 2/2016
CN 108172179 A 6/2018
CN 109949775 A 6/2019
CN 110097860 A 8/2019
CN 110427091 A 11/2019
CN 110459184 A 11/2019
CN 112202237 A 1/2021

(Continued)

OTHER PUBLICATIONS

WIPO, International Search Report and Written Opinion for International Application No. PCT/CN2022/142509, dated Apr. 25, 2023.

(Continued)

*Primary Examiner* — Long D Pham
(74) *Attorney, Agent, or Firm* — HAUPTMAN HAM, LLP

(57) ABSTRACT

A drive circuit of a display panel and a display device are provided in the disclosure. The drive circuit includes a voltage output module. The voltage output module includes a voltage input terminal, a voltage output terminal, a detection module, and an isolation module. The voltage input terminal is configured to receive a voltage signal. The voltage output terminal is electrically coupled with the display panel. The detection module is electrically coupled with the voltage input terminal and configured to determine whether a voltage value of the voltage signal received at the voltage input terminal is greater than or equal to a preset voltage threshold. The detection module is configured to output a second control signal when the voltage value of the voltage signal is less than the preset voltage threshold.

18 Claims, 6 Drawing Sheets

(56) References Cited

FOREIGN PATENT DOCUMENTS

| | | | |
|---|---|---|---|
| CN | 213028651 | U | 4/2021 |
| CN | 112908277 | A | 6/2021 |
| CN | 112992092 | A | 6/2021 |
| CN | 113036900 | A | 6/2021 |
| CN | 113192449 | A | 7/2021 |
| CN | 114822402 | A | 7/2022 |
| TW | 201443601 | A | 11/2014 |

OTHER PUBLICATIONS

The first office action issued in corresponding CN application No. 202211030027.6 dated Jun. 30, 2023.

* cited by examiner

POWER-SUPPLY VOLTAGE GENERATOR FOR OUTPUTTING VARIED VOLTAGES TO DISPLAY PANEL

CROSS-REFERENCE TO RELATED APPLICATIONS

This application claims priority under 35 U.S.C. § 119(a) to Chinese Patent Application No. 202211030027.6, filed Aug. 26, 2022, the entire disclosure of which is incorporated herein by reference.

TECHNICAL FIELD

This disclosure relates to the field of display technology, and in particular, to a drive circuit of a display panel and a display device.

BACKGROUND

Organic Light-Emitting Diode (OLED) displays have found increasingly wide utilization because of their advantages such as low power consumption, fast response speed, wide viewing angle.

The OLED display includes a power-supply voltage generation module, a data voltage generation module, and a display panel, where the power-supply voltage generation module is configured to provide a power-supply voltage Vdd to the display panel, and the data voltage generation module is configured to provide a data voltage Vdata for the display panel. Since the power-supply voltage generation module is provided with a capacitor such as a filter capacitor, it is required to first charge the capacitor when powering the display on. According to the formula Ic=C*duc/dt for calculating a charging and discharge current of a capacitor, it is known that the power-supply voltage generation module may generate a relatively large capacitive charging current when powering the display on, and the greater a capacitance value the larger the current. As such, the power-supply voltage Vdd is unstable, and the relatively large charging current may have an impact on the OLED and thus affect a service life of the OLED. It is required to discharge the capacitor when shutting the display down, and thus a voltage of a power-supply voltage line cannot be zeroed quickly, resulting in a screen flickering of the display at shutdown when a residual voltage of the power-supply voltage line is superimposed with a residual charge in a drive circuit. Similarly, the data voltage Vdata also has similar problems in instability when powering the display on/off.

SUMMARY

A drive circuit of a display panel is provided in the disclosure. The drive circuit includes a voltage output module and is configured to provide a voltage signal to the display panel via the voltage output module. The voltage output module includes a voltage input terminal, a voltage output terminal, a detection module, and an isolation module. The voltage input terminal is configured to receive the voltage signal. The voltage output terminal is electrically coupled with the display panel. The detection module is electrically coupled with the voltage input terminal and configured to determine whether a voltage value of the voltage signal received at the voltage input terminal is greater than or equal to a preset voltage threshold. The detection module is configured to output a first control signal when the voltage value of the voltage signal is greater than or equal to the preset voltage threshold and output a second control signal when the voltage value of the voltage signal is less than the preset voltage threshold. The isolation module is electrically coupled between the voltage input terminal and the voltage output terminal and further electrically coupled with the detection module. The isolation module is configured to receive the first control signal and conduct an electrical coupling between the voltage input terminal and the voltage output terminal in response to the first control signal. The isolation module is further configured to receive the second control signal and break the electrical coupling between the voltage input terminal and the voltage output terminal in response to the second control signal.

The drive circuit provided in the disclosure includes the voltage output module, and the detection module in the voltage output module is configured to determine whether the voltage value of the voltage signal is greater than or equal to the preset voltage threshold. The detection module is configured to output the second control signal when the voltage value of the voltage signal is less than the preset voltage threshold, thereby controlling non-conduction of the isolation module in the voltage output module and thus avoiding that the display device outputs an unstable voltage signal to the display panel when powering the display device on/off, so that it is possible to avoid not only an impact on the display panel but also a screen flickering at starting up and shutdown.

Optionally, the voltage output terminal further includes a discharge circuit electrically coupled with the voltage output terminal and further electrically coupled with an output terminal of the detection module. The first control signal is further used to cut off the discharge circuit, and the second control signal is further used to conduct the discharge circuit.

Optionally, the detection module includes a comparator. The comparator has a non-inverting input terminal electrically coupled with the voltage input terminal, an inverting input terminal configured to receive a reference voltage signal, and an output terminal electrically coupled with the isolation module. The reference voltage signal has a voltage value equal to the preset voltage threshold.

Optionally, the isolation module includes a first switching transistor electrically coupled between the voltage input terminal and the voltage output terminal. The first switching transistor has a control terminal electrically coupled with the output terminal of the detection module.

Optionally, the discharge circuit includes a grounding terminal, and a second switching transistor and an electric resistance that are coupled in series between the voltage output terminal and the grounding terminal. The second switching transistor has a control terminal electrically coupled with the output terminal of the detection module.

Optionally, the first switching transistor is a high-level conduction transistor, the second switching transistor is a low-level conduction transistor, the first control signal is a high-level signal, and the second control signal is a low-level signal.

Optionally, the electric resistance has a resistance value ranging from 1 kΩ to 10 kΩ.

Optionally, the drive circuit further includes a power-supply voltage generation module electrically coupled with the voltage input terminal. The power-supply voltage generation module is configured to generate a power-supply voltage signal, and the voltage signal received at the voltage input terminal is the power-supply voltage signal. The voltage output terminal is electrically coupled with a power-supply voltage line in the display panel.

Optionally, the drive circuit further includes a data voltage generation module electrically coupled with the voltage input terminal. The data voltage generation module is configured to generate a data voltage signal, and the voltage signal received at the voltage input terminal is the data voltage signal. The voltage output terminal is electrically coupled with a data line in the display panel.

A display device is further provided in the disclosure. The display device includes a display panel and the drive circuit above, where the drive circuit is electrically coupled with the display panel.

Additional aspects and advantages of the disclosure will be partially illustrated hereinafter, and part of the additional aspects and advantages will become apparent with reference to the following illustration or be learned through practices of the disclosure.

The disclosure is further illustrated in the following implementations with reference to the above accompanying drawings.

DETAILED DESCRIPTION

The following will illustrate clearly and completely technical solutions of implementations of the disclosure with reference to accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within a protection scope of the disclosure.

In illustration of the disclosure, it should be noted that directional or positional relationships indicated by terms such as “on”, “under”, “left”, “right”, and the like are directional or positional relationships based on accompanying drawings and are only for the convenience of illustration and simplicity, rather than explicitly or implicitly indicate that devices or components referred to herein must have a certain direction or be structured or operated in a certain direction and therefore cannot be understood as limitations to the disclosure. In addition, terms “first”, “second”, and the like are only used for illustration and cannot be understood as explicitly or implicitly indicating relative importance.

Figure 1:
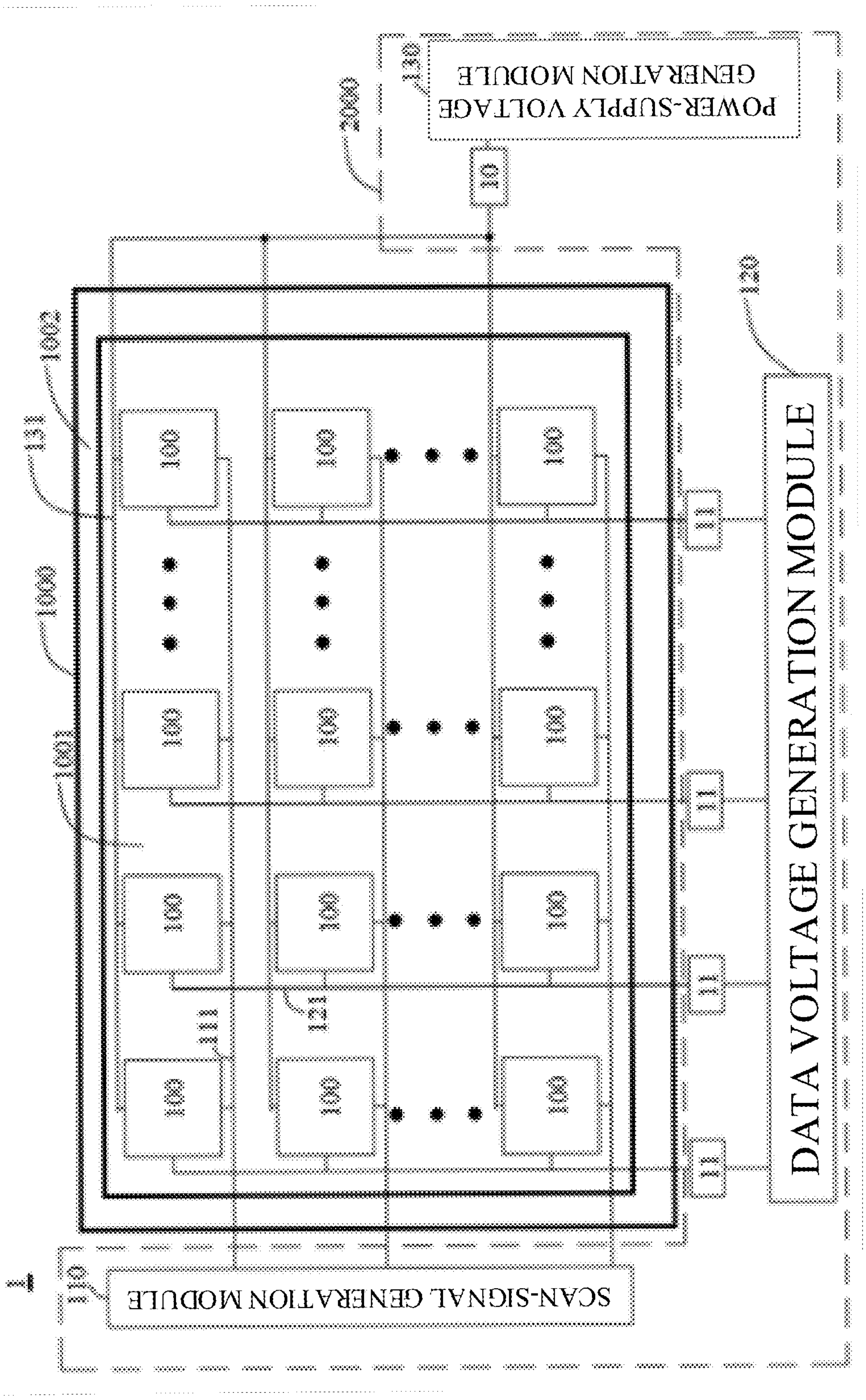
FIG. 1 is a schematic structural diagram illustrating a display device provided in implementations of the disclosure, where the display device includes a pixel drive circuit, a first voltage-output module, and a second voltage-output module.

Referring to FIG. 1, a display device 1 is provided in the disclosure and includes a display panel 1000 and a drive circuit 2000 that are electrically coupled with each other. The display panel 1000 includes a display region 1001 and a non-display region 1002. The display panel 1000 is provided with multiple pixel drive circuits 100 arranged in an array in the display region 1001. The drive circuit 2000 includes a scan-signal generation module 110, a data voltage generation module 120, and a power-supply voltage generation module 130. The scan-signal generation module 110 is electrically coupled with multiple rows of the pixel drive circuits 100 via multiple scan lines 111, respectively, and is configured to generate a corresponding scan signal for each row of pixel drive circuits 100. The data voltage generation module 120 is electrically coupled with multiple columns of the pixel drive circuits 100 via multiple data lines 121, respectively, and is configured to generate a corresponding data voltage signal for each column of pixel drive circuits 100. The power-supply voltage generation module 130 is electrically coupled with the multiple rows of the pixel drive circuits 100 via multiple power-supply voltage lines 131, respectively, and is configured to generate a corresponding power-supply voltage signal Vdd for each row of pixel drive circuits 100.

In view of above, the drive circuit 2000 of the display panel 1000 and the display device are provided in the disclosure, which aim to solve problems that an existing Organic Light-Emitting Diode (OLED) display is prone to impact the OLED and generate a screen flickering at shutdown due to instability of a power-supply voltage Vdd and a data voltage Vdata when powering the OLED display on/off.

Figure 2:
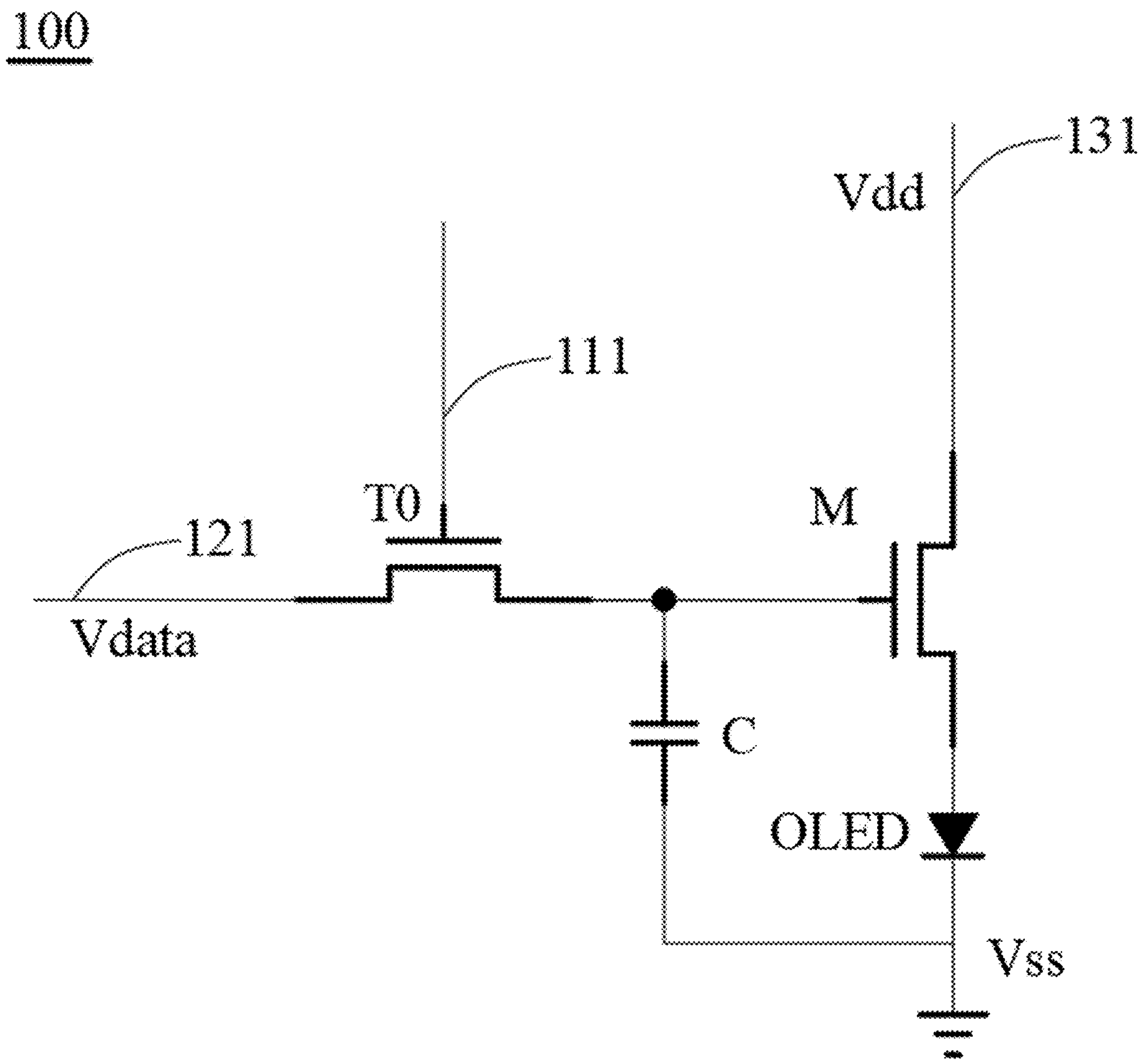
FIG. 2 is a schematic structural diagram illustrating the pixel drive circuit illustrated in FIG. 1.

Refer to FIG. 2, which illustrates the pixel drive circuit 100 of Two-Transistors-One-Capacitor (2T1C) provided in the disclosure. In other implementations, the pixel drive circuit 100 can also be other types such as Five-Transistors-One-Capacitor (5T1C), Six-Transistors-One-Capacitor (6T1C), or Seven-Transistors-One-Capacitor (7T1C). As illustrated in FIG. 2, the pixel drive circuit 100 includes a scan transistor TO, a drive transistor M, an energy storage capacitor C, and an Organic Light-Emitting Diode (OLED). The OLED has a cathode electrically coupled with a reference voltage terminal and configured to receive a reference voltage signal Vss (e.g., a zero-potential voltage). The drive transistor M has a source electrically coupled with the power-supply voltage line 131 and configured to receive the power-supply voltage signal Vdd. The drive transistor M has a drain electrically coupled with an anode of the OLED and a gate electrically coupled with a drain of the scan transistor TO. The scan transistor TO has a source electrically coupled with the data line 121 and configured to receive the data voltage signal Vdata. The scan transistor TO has a gate electrically coupled with the scan line 111 and configured to receive the scan signal. The energy storage capacitor C is electrically coupled between the gate of the drive transistor M and the cathode of the OLED. Exemplarily, when the scan signal is a signal for powering up the scan transistor TO, the scan transistor TO is on, the energy storage capacitor C is charged by a data voltage signal Vdata of the data line 121 via the scan transistor TO, and provides a control signal to the gate of the drive transistor M according to a charging voltage. When the scan signal is a signal for powering off the scan transistor TO, the scan transistor TO is off, electric charges stored in the energy storage capacitor C continue to provide the control signal to the gate of the drive transistor M, such that the drive transistor M maintains in an on-state, and thus the OLED can emit lights in a whole frame period according to the power-supply voltage signal Vdd and the reference voltage signal Vss. Exemplarily, the scan transistor TO and the drive transistor M each may be a low-temperature polysilicon transistor. The low-temperature polysilicon transistor has a relatively high migration rate, thus it is possible to speed up a conduction of the scan transistor TO and the drive transistor M, and in turn speed up response of the pixel drive circuit 100, thereby improving a display effect of the display device 1.

Figure 3:
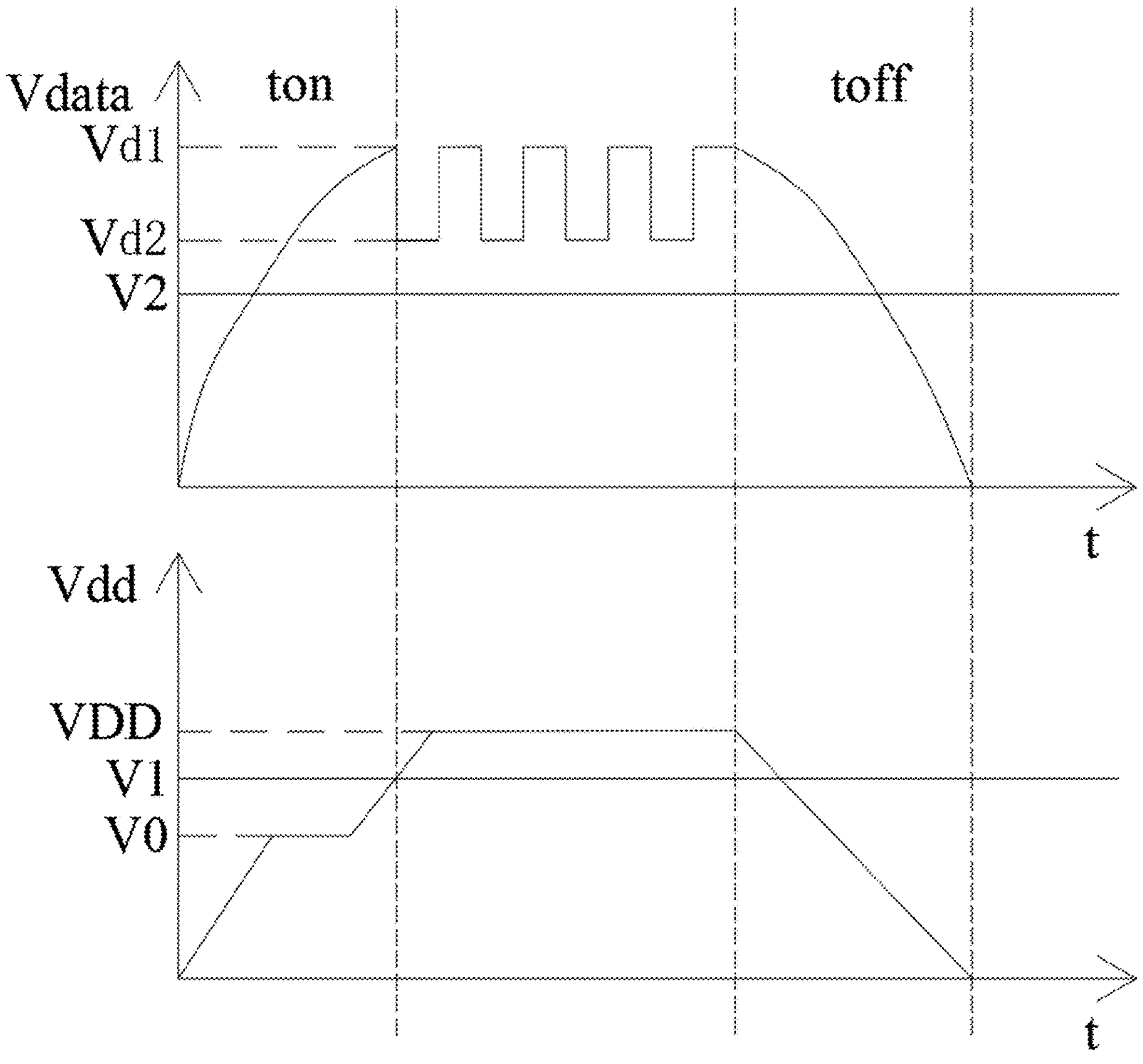
FIG. 3 is a schematic diagram illustrating a voltage waveform of a power-supply voltage signal and a voltage waveform of a data voltage signal of a display device provided in implementations of the disclosure in a process from starting up to shutdown.

The power-supply voltage generation module 130 generally includes a boost chopper circuit and therefore necessarily definitely includes a Metal-Oxide-Semiconductor (MOS) transistor, while Miller Capacitance of the MOS transistor will make the power-supply voltage signal Vdd have a Miller Effect at starting up of the display device 1. As illustrated in FIG. 3, at starting up, the power-supply voltage signal Vdd rises to a miller plateau voltage V0, remains at miller plateau voltage V0 for a duration, and then starts to rise again until reaching a target power-supply voltage value VDD. According to the formula Ic=C*duc/dt for calculating a charging and discharge current of a capacitor, it is known that the power-supply voltage generation module 130 may generate a relatively large capacitive charging current when powering the display device 1 on, and the greater a capacitance value the larger the current. As such, the power-supply voltage Vdd is unstable, and the relatively large charging current may have an impact on the display device 1, and thus affect a service life of the display device 1. The capacitor needs to be discharged when powering the display device 1 off, and thus a voltage of the power-supply voltage line 131 can be zeroed after elapse of a shutdown duration toff, and a screen flickering of the display panel 1000 is caused at shutdown when a residual voltage of the power-supply voltage line 131 is superimposed with a residual charge in other elements in the drive panel 1000.

The data voltage generation module 120 generally includes a capacitor, and thus at starting up of the display device 1, the data voltage signal Vdata can have a target data voltage waveform after elapse of starting-up duration ton. As illustrated in FIG. 3, the target data voltage waveform is a square waveform with a maximum preset level Vd1 and a minimum preset level Vd2. It can be understood that, within the starting-up duration ton and the shutdown duration toff, the waveform of the data voltage signal Vdata is unstable, and here the data voltage signal Vdata is an invalid data voltage signal. At starting-up, the data voltage signal Vdata reaches a target value earlier than the power-supply voltage signal Vdd reaches the target value. If the display panel 1000 has a relatively high temperature, a threshold voltage of the scan transistor TO in the pixel drive circuit 100 will decrease, causing that a charging of the energy storage capacitor C by the data voltage signal Vdata happens prematurely and thus causing that switching-on of the drive transistor M happens prematurely, and at this time, since the voltage of the power-supply voltage signal Vdd has risen to a relatively high potential, the OLED will be consequentially driven to emit lights, resulting in a screen flickering of the display panel 1000 at shutdown. In addition, at shutdown, if the display panel 1000 has a relatively high temperature, the threshold voltage of the scan transistor TO will decrease and the scan transistor TO cannot be switched off in time, and at this time, the invalid data voltage signal is applied on the energy storage capacitor C, causing switching-off of the drive transistor M delayed, and thus the voltage of the power-supply voltage signal Vdd will slowly decrease and still at a relatively high potential, resulting in a screen flickering of the display panel 1000 at shutdown.

Referring to FIG. 1 again, for solving the above problems, the drive circuit 2000 of the display device 1 provided in the disclosure further includes a voltage output module, and the voltage output module includes a first voltage-output module 10 and a second voltage-output module 11. The first voltage-output module 10 is electrically coupled between the power-supply voltage generation module 130 and the power-supply voltage line 131 in the display panel 1000. The drive circuit 2000 is configured to provide the power-supply voltage signal Vdd for the display panel 1000 via the first voltage-output module 10. The second voltage-output module 11 is electrically coupled between the data voltage generation module 120 and the data line 121 in the display panel 1000. The drive circuit 2000 is configured to provide the data voltage signal Vdata for the display panel 1000 via the second voltage-output module 11. Exemplarily, the first voltage-output module 10 can be integrated in a power-supply chip together with the power-supply voltage generation module 130, and the second voltage-output module 11 can be integrated in a data-driven chip together with the data voltage generation module 120. The first voltage-output module 10 can also be independent of the power-supply voltage generation module 130, and the second voltage-output module 11 can also be independent of the data voltage generation module 120. For example, the first voltage-output module 10 and the second voltage-output module 11 each are disposed in the display panel 1000, where the first voltage-output module 10 and the second voltage-output module 11 each include a Thin Film Transistor (TFT). In this way, the first voltage-output module 10 and the second voltage-output module 11 can be formed together in a manufacturing process of the display panel 1000, which can save production costs.

Figure 4:
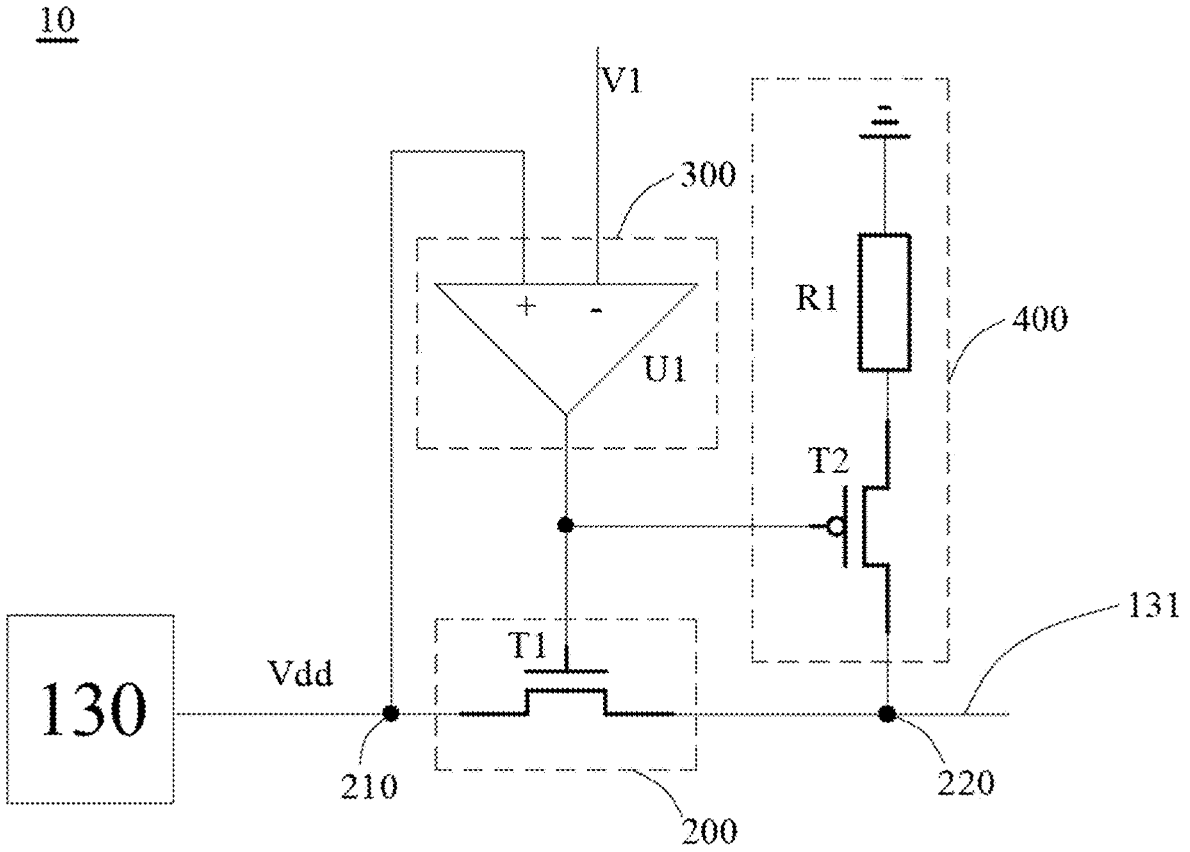
FIG. 4 is a schematic circuit diagram of the first voltage-output module illustrated in FIG. 1 according to an implementation of the disclosure.

Referring to FIG. 4, a circuit structure and an operating principle of the first voltage-output module 10 are described in detail hereinafter with reference to FIG. 4. The first voltage-output module 10 includes a voltage input terminal 210, a voltage output terminal 220, an isolation module 200, and a detection module 300.

The voltage input terminal 210 is electrically coupled with the power-supply voltage generation module 130 and configured to receive the power-supply voltage signal Vdd. The voltage output terminal 220 is electrically coupled with the power-supply voltage line 131 in the display panel 1000. It needs to be noted that, for convenience of illustration, coupling points connected between the voltage output module and other modules are defined as the voltage input terminal and the voltage output terminal in the disclosure. It can be understood that, the voltage input terminal and the voltage output terminal 220 can be physical ports where the voltage output module is coupled with other modules and can also be coupling points between two modules, which are not limited herein.

Furthermore, the detection module 300 is electrically coupled with the voltage input terminal 210 and configured to determine whether a voltage value of a voltage signal (i.e., the power-supply voltage signal Vdd) received at the voltage input terminal 210 is greater than or equal to a preset voltage threshold. The detection module 300 is configured to output a first control signal when the voltage value of the voltage signal is greater than or equal to the preset voltage threshold and output a second control signal when the voltage value of the voltage signal is less than the preset voltage threshold. Exemplarily, the detection module 300 includes a comparator U1. The comparator U1 has a non-inverting input terminal electrically coupled with the voltage input terminal 210, an inverting input terminal configured to receive a reference voltage signal V1, and an output terminal electrically coupled with the isolation module 200. The reference voltage signal V1 has a voltage value equal to the preset voltage threshold. Preferably, the preset voltage threshold is greater than the miller plateau voltage V0, so that the miller plateau can be eliminated. For example, the preset voltage threshold is 0.5~0.8 times of the target power-supply voltage value VDD. It needs to be noted that, when powering the display device 1 up, a voltage ripple may appear after the voltage value of the power-supply voltage signal Vdd rises from zero to more than 0.8 times the target power-supply voltage value VDD. Therefore, in order to prevent the output voltage of the first voltage-output module 10 from being unstable due to repeated switching of a control signal output by the comparator U1 between the first control signal and the second control signal, the preset voltage threshold is preferably 0.7~0.8 times of the target power-supply voltage value VDD. For example, the preset voltage threshold ranges from 8.4 V to 9.6 V if the target power-supply voltage value VDD is 12 V. It needs to be noted that, the comparator U1 has a relative large input impedance, thus a discharge circuit 400 may not affect the display effect of the display panel 1000 when the display device 1 is operating normally. The detection module 300 may also be other elements with a voltage value comparison function, such as a power-supply chip or a control assembly such as a stand-alone Microcontroller Unit (MCU), a one-chip computer, or a Digital Signal Processing (DSP). The first control signal is a high-level signal, and the second control signal is a low-level signal.

Furthermore, the isolation module 200 is electrically coupled between the voltage input terminal 210 and the voltage output terminal 220 and further electrically coupled with the detection module 300 (e.g., an output terminal of the comparator U1). The isolation module 200 is configured to receive the first control signal and conduct an electrical coupling between the voltage input terminal 210 and the voltage output terminal 220 in response to the first control signal. The isolation module 200 is further configured to receive the second control signal and break the electrical coupling between the voltage input terminal 210 and the voltage output terminal 220 in response to the second control signal. Exemplarily, the isolation module 200 includes a first switching transistor T1 electrically coupled between the voltage input terminal 210 and the voltage output terminal 220. The first switching transistor T1 has a control terminal electrically coupled with the output terminal (e.g., the output terminal of the comparator U1) of the detection module 300. Exemplarily, the first switching transistor T1 is a high-level conduction transistor such as a Negative-MOS (NMOS) transistor.

Optionally, the first voltage-output terminal 10 further includes the discharge circuit 400 electrically coupled with the voltage output terminal 220 and further electrically coupled with the output terminal (e.g., the output terminal of the comparator U1) of the detection module 300. The first control signal is further used to cut off the discharge circuit 400, and the second control signal is further used to conduct the discharge circuit 400. Exemplarily, the discharge circuit 400 includes a grounding terminal, and a second switching transistor T2 and an electric resistance R1 that are coupled in series between the voltage output terminal 220 and the grounding terminal. The second switching transistor T2 has a control terminal electrically coupled with the output terminal of the detection module 300. Exemplarily, the second switching transistor T2 is a low-level conduction transistor such as a Positive-MOS (PMOS) transistor. Exemplarily, the electric resistance R1 has a resistance value ranging from 1 kΩ to 10 kΩ. As such, the discharge circuit 400 has a relatively large input impedance and may not affect the display effect of the display panel 1000 when the display device 1 is in normal operation.

The voltage value of the power-supply voltage signal Vdd rises from zero when powering the display device 1 on. The comparator U1 outputs the second control signal before the voltage value of the power-supply voltage signal Vdd rises to the preset voltage threshold. The first switching transistor T1 breaks the electrical coupling between the voltage input terminal 210 and the voltage output terminal 220 in response to the second control signal, and the second switching transistor T2 conducts an electrical coupling between the voltage output terminal 220 and the grounding terminal in response to the second control signal, so that the source of the drive transistor M in each pixel drive circuit 100 in the display panel 1000 cannot receive the power-supply voltage signal Vdd and thus is at a zero potential. It can be understood that, the OLED will emit lights only when the drive transistor M is on and the voltage value of the power-supply voltage signal Vdd received at the anode of the OLED is greater than a voltage value of the reference voltage signal Vss. Therefore, when the source of the driver transistor M in each pixel driver circuit 100 is at the zero potential, the OLED will not emit lights even if the driver transistor M in the pixel driver circuit 100 is switched on prematurely, so that an impact on the display panel 1000 at starting up can be avoided and a screen flickering at shutdown can be effectively avoided. The comparator U1 outputs the first control signal after the voltage value of the power-supply voltage signal Vdd rises to the preset voltage threshold. The first switching transistor T1 conducts the electrical coupling between the voltage input terminal 210 and the voltage output terminal 220 in response to the first control signal, and the second switching transistor T2 breaks the electrical coupling between the voltage output terminal 220 and the grounding terminal in response to the first control signal, so that each pixel driver circuit 100 in the display panel 1000 can receive a stable power-supply voltage signal Vdd. As mentioned above, the input impedance of each of the comparator U1 and the discharge circuit 400 is relatively large, and the display effect of the display panel 1000 will not be affected when the display device 1 is operating normally.

The voltage value of the power-supply voltage signal Vdd decreases from the target power-supply voltage value VDD when powering the display device 1 off, and the comparator U1 outputs the second control signal after the voltage value of the power-supply voltage signal Vdd decreases to the preset voltage threshold. The first switching transistor T1 breaks the electrical coupling between the voltage input terminal 210 and the voltage output terminal 220 in response to the second control signal, and the second switching transistor T2 conducts the electrical coupling between the voltage output terminal 220 and the grounding terminal in response to the second control signal, so that each pixel driver circuit 100 in the display panel 1000 stops receiving the power-supply voltage signal Vdd. In this way, the OLED will not emit lights even if switching-off of the driver transistor M in the pixel driver circuit 100 is delayed, so that it is possible to not only avoid an impact on the display panel 1000 at shutdown but also effectively avoid a screen flickering at shutdown. In addition, each pixel driver circuit 100 in the display panel 1000 can drain residual charges to the grounding terminal through the power-supply voltage line 131 and the discharge circuit 400, thereby further avoiding a screen flickering at shutdown and thus improving a user experience.

Figure 5:
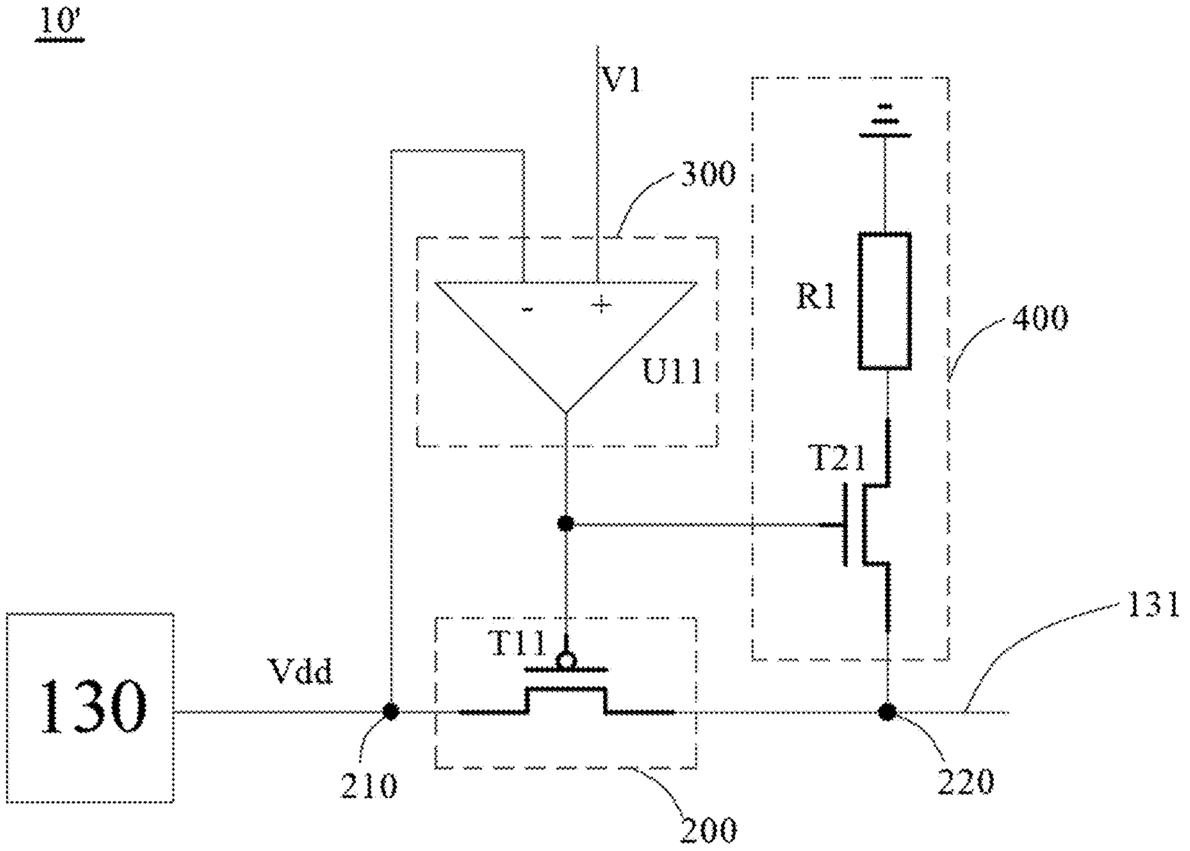
FIG. 5 is a schematic circuit diagram of the first voltage-output module illustrated in FIG. 1 according to an implementation of the disclosure.

FIG. 5 is a schematic circuit diagram of a first voltage-output module 10' provided in the disclosure. The first voltage-output module 10' has a circuit structure similar to the first voltage-output module 10 illustrated in FIG. 4, except the following. In the implementation, a comparator U11 in the first voltage-output module 10' has a non-inverting input terminal configured to receive the reference voltage signal V1 and an inverting input terminal electrically coupled with the voltage input terminal 210. A first switching transistor T11 is a low-level conduction transistor such as a PMOS transistor, and a second switching transistor T21 is a high-level conduction transistor such as an NMOS transistor. The first control signal is a low-level signal, and the second control signal is a high-level signal.

Figure 6:
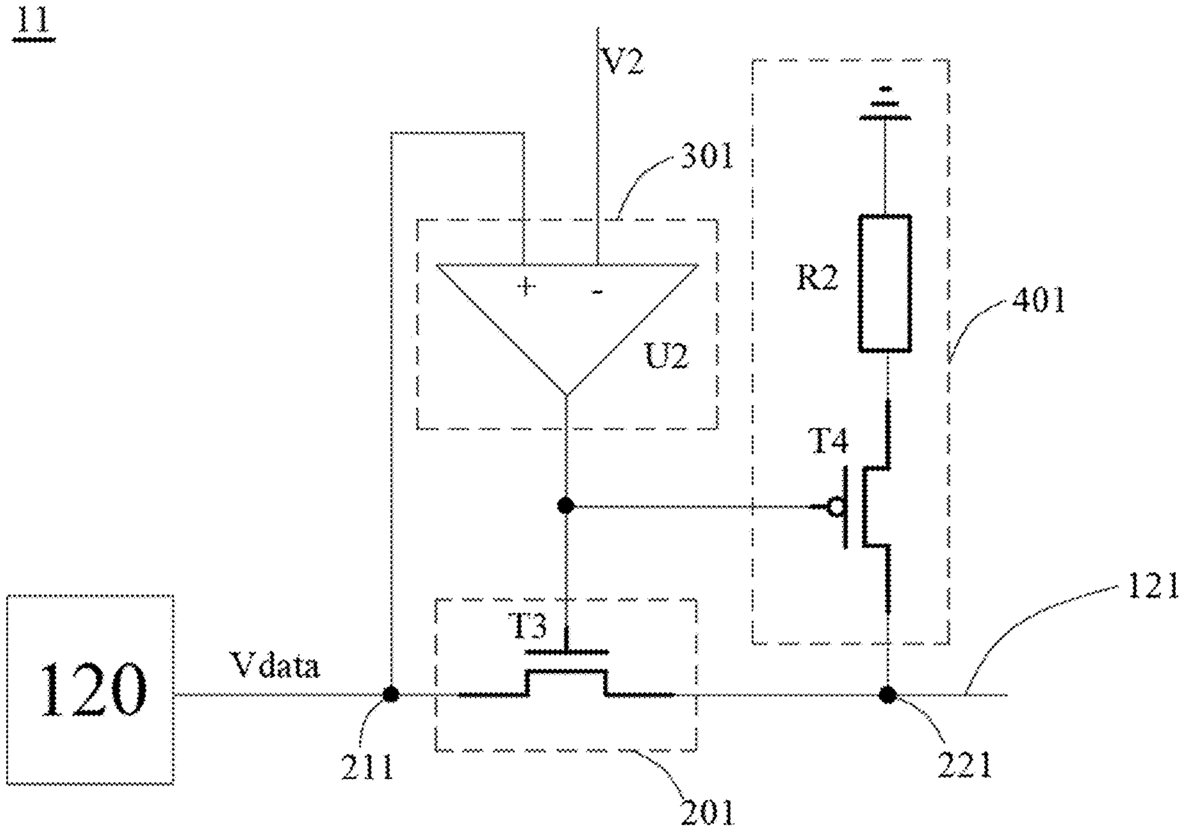
FIG. 6 is a schematic circuit diagram of the second voltage-output module illustrated in FIG. 1.

FIG. 6 is a schematic circuit diagram of the second voltage-output module 11. The second voltage-output module 11 has a circuit structure similar to the first voltage-output module 10 illustrated in FIG. 4, except the following. The second voltage-output module 11 has a voltage input terminal 211 electrically coupled with the data voltage generation module 120 and configured to receive the data voltage signal Vdata and a voltage output terminal 221 electrically coupled with the data line 121 in the display panel 1000. A comparator U2 has an inverting input terminal configured to receive a reference voltage signal V2, and the reference voltage signal V2 has a voltage value equal to a preset data voltage threshold. As mentioned above, the data voltage signal Vdata may have the maximum preset level Vd1 and the minimum preset level Vd2, and the preset data voltage threshold is preferably 0.7~0.8 times a voltage value of the minimum preset level Vd2. For example, the preset data voltage threshold ranges from 3.5 V to 4 V if the voltage value of the minimum preset level Vd2 is 5 V.

It needs to be noted that, the first switching transistors T1, T3, T11 and the second switching transistors T2, T4, T21 in the disclosure each may be an Amorphous Silicon Thin Film Transistor (a-Si TFT), a Low Temperature Polysilicon Thin Film Transistor (LTPS TFT), or an Oxide Semiconductor Thin Film Transistor (Oxide TFT). The Oxide TFT has an active layer made of an oxide semiconductor (Oxide) such as Indium Gallium Zinc Oxide (IGZO). In the disclosure, the comparators U1, U11, and U2 each can be a TFT when the first voltage-output module 10 and the second voltage-output module 11 each are disposed in the display panel 1000.

The drive circuit 2000 provided in the disclosure includes the voltage output module, and the detection module in the voltage output module is configured to determine whether the voltage value of the voltage signal is greater than or equal to the preset voltage threshold. The detection module is configured to output the second control signal when the voltage value of the voltage signal is less than the preset voltage threshold, thereby controlling non-conduction of the isolation module in the voltage output module and thus avoiding that the display device 1 outputs an unstable voltage signal to the display panel 1000 when powering the display device 1 on/off, so that it is possible to avoid not only an impact on the display panel 1000 but also a screen flickering at starting up and shutdown.

Although implementations of the disclosure have been shown and described, it will be understood by those of ordinary skill in the art that a variety of variations, modifications, replacements and variants of these implementations may be made without departing from the principles and purposes of the disclosure, the scope of which is limited by the claims and their equivalents.

What is claimed is:

1. A drive circuit of a display panel, comprising a voltage output module, wherein the drive circuit is configured to provide a voltage signal to the display panel via the voltage output module, and the voltage output module comprises:

a voltage input terminal configured to receive the voltage signal;

a voltage output terminal electrically coupled with the display panel;

a detection module electrically coupled with the voltage input terminal and configured to determine whether a voltage value of the voltage signal received at the voltage input terminal is greater than or equal to a preset voltage threshold, wherein the detection module is configured to output a first control signal when the voltage value of the voltage signal is greater than or equal to the preset voltage threshold and output a second control signal when the voltage value of the voltage signal is less than the preset voltage threshold; and an isolation module electrically coupled between the voltage input terminal and the voltage output terminal and electrically coupled with the detection module, wherein the isolation module is configured to receive the first control signal and conduct an electrical coupling between the voltage input terminal and the voltage output terminal in response to the first control signal, and the isolation module is further configured to receive the second control signal and break the electrical coupling between the voltage input terminal and the voltage output terminal in response to the second control signal.

2. The drive circuit of claim 1, wherein the voltage output terminal further comprises a discharge circuit electrically coupled with the voltage output terminal and further electrically coupled with an output terminal of the detection module, the first control signal is further used to cut off the discharge circuit, and the second control signal is further used to conduct the discharge circuit.

3. The drive circuit of claim 2, wherein the isolation module comprises a first switching transistor electrically coupled between the voltage input terminal and the voltage output terminal, and the first switching transistor has a control terminal electrically coupled with the output terminal of the detection module.

4. The drive circuit of claim 3, wherein the discharge circuit comprises a grounding terminal, and a second switching transistor and an electric resistance that are coupled in series between the voltage output terminal and the grounding terminal, and the second switching transistor has a control terminal electrically coupled with the output terminal of the detection module.

5. The drive circuit of claim 4, wherein the first switching transistor is a high-level conduction transistor, the second switching transistor is a low-level conduction transistor, the first control signal is a high-level signal, and the second control signal is a low-level signal.

6. The drive circuit of claim 4, wherein the electric resistance has a resistance value ranging from 1 kΩ to 10 kΩ.

7. The drive circuit of claim 1, wherein the detection module comprises a comparator, the comparator has a non-inverting input terminal electrically coupled with the voltage input terminal, an inverting input terminal configured to receive a reference voltage signal, and an output terminal electrically coupled with the isolation module, and the reference voltage signal has a voltage value equal to the preset voltage threshold.

8. The drive circuit of claim 1, wherein the drive circuit further comprises a power-supply voltage generation module electrically coupled with the voltage input terminal, the power-supply voltage generation module is configured to generate a power-supply voltage signal, the voltage signal received at the voltage input terminal is the power-supply voltage signal, and the voltage output terminal is electrically coupled with a power-supply voltage line in the display panel.

9. The drive circuit of claim 1, wherein the drive circuit further comprises a data voltage generation module electrically coupled with the voltage input terminal, the data voltage generation module is configured to generate a data voltage signal, the voltage signal received at the voltage input terminal is the data voltage signal, and the voltage output terminal is electrically coupled with a data line in the display panel.

10. A display device, comprising:

a display panel; and a drive circuit electrically coupled with the display panel, the drive circuit comprising a voltage output module, wherein the drive circuit is configured to provide a voltage signal to the display panel via the voltage output module, and the voltage output module comprises:

a voltage input terminal configured to receive the voltage signal;

a voltage output terminal electrically coupled with the display panel;

a detection module electrically coupled with the voltage input terminal and configured to determine whether a voltage value of the voltage signal received at the voltage input terminal is greater than or equal to a preset voltage threshold, wherein the detection module is configured to output a first control signal when the voltage value of the voltage signal is greater than or equal to the preset voltage threshold and output a second control signal when the voltage value of the voltage signal is less than the preset voltage threshold; and an isolation module electrically coupled between the voltage input terminal and the voltage output terminal and electrically coupled with the detection module, wherein the isolation module is configured to receive the first control signal and conduct an electrical coupling between the voltage input terminal and the voltage output terminal in response to the first control signal, and the isolation module is further configured to receive the second control signal and break the electrical coupling between the voltage input terminal and the voltage output terminal in response to the second control signal.

11. The display device of claim 10, wherein the voltage output terminal further comprises a discharge circuit electrically coupled with the voltage output terminal and further electrically coupled with an output terminal of the detection module, the first control signal is further used to cut off the discharge circuit, and the second control signal is further used to conduct the discharge circuit.

12. The display device of claim 11, wherein the isolation module comprises a first switching transistor electrically coupled between the voltage input terminal and the voltage output terminal, and the first switching transistor has a control terminal electrically coupled with the output terminal of the detection module.

13. The display device of claim 12, wherein the discharge circuit comprises a grounding terminal, and a second switching transistor and an electric resistance that are coupled in series between the voltage output terminal and the grounding terminal, and the second switching transistor has a control terminal electrically coupled with the output terminal of the detection module.

14. The display device of claim 13, wherein the first switching transistor is a high-level conduction transistor, the second switching transistor is a low-level conduction transistor, the first control signal is a high-level signal, and the second control signal is a low-level signal.

15. The display device of claim 13, wherein the electric resistance has a resistance value ranging from 1 kΩ to 10 kΩ.

16. The display device of claim 10, wherein the detection module comprises a comparator, the comparator has a non-inverting input terminal electrically coupled with the voltage input terminal, an inverting input terminal configured to receive a reference voltage signal, and an output terminal electrically coupled with the isolation module, and the reference voltage signal has a voltage value equal to the preset voltage threshold.

17. The display device of claim 10, wherein the drive circuit further comprises a power-supply voltage generation module electrically coupled with the voltage input terminal, the power-supply voltage generation module is configured to generate a power-supply voltage signal, the voltage signal received at the voltage input terminal is the power-supply voltage signal, and the voltage output terminal is electrically coupled with a power-supply voltage line in the display panel.

18. The display device of claim 10, wherein the drive circuit further comprises a data voltage generation module electrically coupled with the voltage input terminal, the data voltage generation module is configured to generate a data voltage signal, the voltage signal received at the voltage input terminal is the data voltage signal, and the voltage output terminal is electrically coupled with a data line in the display panel.

* * * * *